(12) United States Patent
Ferranti

(10) Patent No.: US 9,988,984 B2
(45) Date of Patent: Jun. 5, 2018

(54) TURBO-CHARGING SYSTEM OF AN ENGINE

(71) Applicant: Flavio Ferranti, Gubbio (IT)

(72) Inventor: Flavio Ferranti, Gubbio (IT)

( * ) Notice: Subject to any disclaimer, the term of this patent is extended or adjusted under 35 U.S.C. 154(b) by 368 days.

(21) Appl. No.: 14/895,897

(22) PCT Filed: May 28, 2014

(86) PCT No.: PCT/IB2014/000890
§ 371 (c)(1),
(2) Date: Dec. 3, 2015

(87) PCT Pub. No.: WO2014/195777
PCT Pub. Date: Dec. 11, 2014

(65) Prior Publication Data
US 2016/0115868 A1    Apr. 28, 2016

(30) Foreign Application Priority Data

Jun. 5, 2013  (IT) ............................... CZ2013A0012
May 28, 2014 (IT) ............................... CZ2014A0010

(51) Int. Cl.
*F02C 6/12*   (2006.01)
*F02B 29/02*  (2006.01)
*F02B 33/34*  (2006.01)

(52) U.S. Cl.
CPC ............... *F02C 6/12* (2013.01); *F02B 29/02* (2013.01); *F02B 33/34* (2013.01); *Y02T 10/146* (2013.01)

(58) Field of Classification Search
CPC .. F02C 6/12; F02B 29/02; F02B 33/34; Y02T 10/146

USPC .................................................. 60/605.1–612
See application file for complete search history.

(56) References Cited

U.S. PATENT DOCUMENTS

| 3,059,415 A * | 10/1962 | Birmann ............... F01D 17/165 |
| | | 415/147 |
| 4,537,173 A | 8/1985 | Norris |
| 6,062,027 A * | 5/2000 | Landfahrer ............. F02B 37/00 |
| | | 60/605.2 |
| 6,742,335 B2 * | 6/2004 | Beck ....................... F01N 3/021 |
| | | 123/568.11 |
| 2005/0193732 A1 * | 9/2005 | LaRue .................. F01D 25/125 |
| | | 60/605.1 |
| 2014/0208740 A1 * | 7/2014 | Malone ................ F02B 37/013 |
| | | 60/605.1 |
| 2015/0369642 A1 * | 12/2015 | Cox ........................ F01D 17/02 |
| | | 73/112.05 |

FOREIGN PATENT DOCUMENTS

DE   10 2010 043 800 A1   6/2011
FR       2 610 672 A1      8/1988

* cited by examiner

*Primary Examiner* — Hoang Nguyen
(74) *Attorney, Agent, or Firm* — Seed IP Law Group LLP

(57) ABSTRACT

A turbo-charging system of an engine comprising: a central body on which a turbine and a compressor, both keyed on a same shaft, are mounted; and at least two flange diffusers connected to two Venturi tubes comprised in the central body and ending with nozzles. The turbocharging system is interposed between the engine air filter and the engine throttle unit, the turbine receiving from the nozzles the engine intaking air at the output of the air filter whose flow determines the handling of the turbine and, through the shaft, of the compressor.

8 Claims, 6 Drawing Sheets

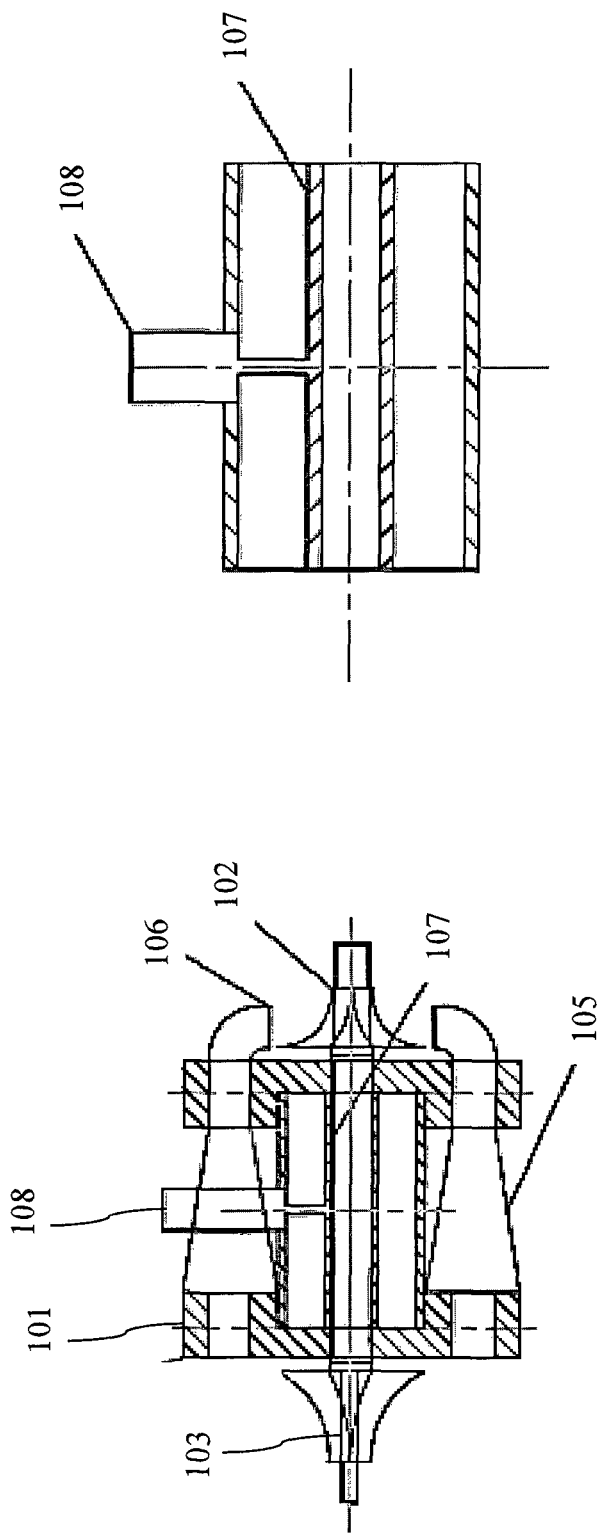

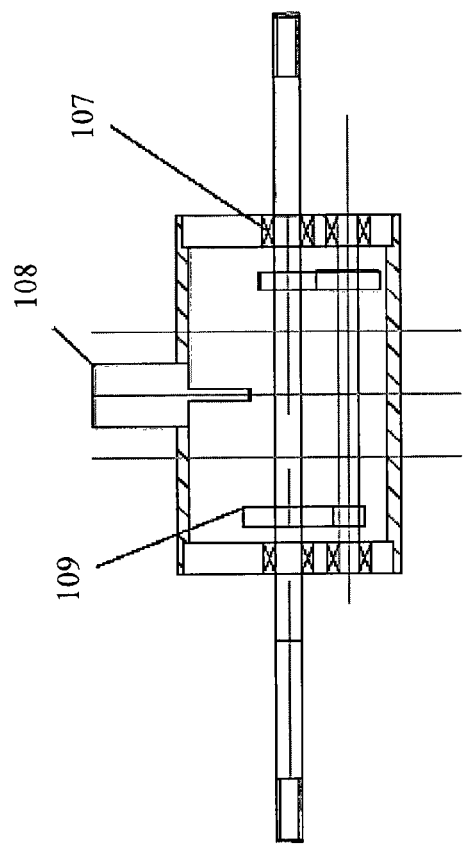
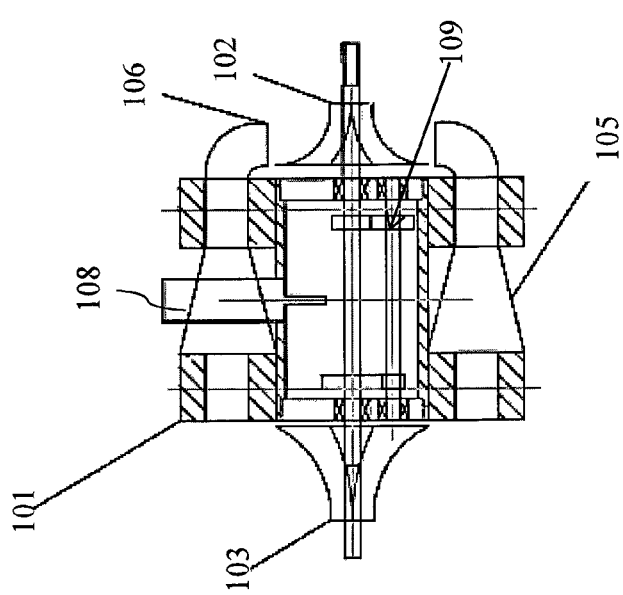
Fig.4b
Fig.4a
Fig.4

TURBO-CHARGING SYSTEM OF AN ENGINE

BACKGROUND

Technical Field

The present invention relates to a turbo-charging system of an engine.

In particular the present invention relates to a turbo-charging system of an engine, of the type connected to the intake phase of the engine.

Description of the Related Art

It's well known that internal combustion engines having pistons can be distinguished in:

compression ignition diesel engine, characterized by the introduction of the finely atomized fuel at the end of the compression and therefore at its power on, which occurs spontaneously; and gasoline carburetion engine with carburetor or injection and having spark ignition and subsequent flame propagation.

In the gasoline carburetor engine the mixing of the fuel and the combustive is usually made through a carburetor externally to the engine, causing the continuous injection of fuel into the intake pipe in which the air spirated from the pistons flows. In the gasoline injection engine, compared to carburetion through a carburetor, there is the direct injection of fuel into the cylinder during the intake phase and in part during the compression, that's advantageous in terms of economy of consumption.

In addition, the direct or indirect injection has several advantages compared to carburetion by a carburetor:

1) increasing the volumetric efficiency, for the increased size of the supply pipes;
2) elimination of backfiring danger, because the pipes are fuel free;
3) improvement of dead space washing, which is carried out with air and can therefore be prolonged without wasting fuel during exhaustion;
4) fuel economy because a good combustion is possible;
5) more vivid acceleration, because the fuel does not have to travel through long pipes; and
6) greater ease of design of the engine, since the position of the injection system (pump, any distributor, regulator, injectors) is not strictly bound to that of the motor.

The majority of the cars are equipped with four-stroke engines. An operation cycle, shown in FIG. 1, consists of the following four phases:

The intake phase, in which, when the piston is lowered from the top deadlock to bottom deadlock, and draws in the cylinder, through the appropriate intake valve open, an air current which, passing through the carburetor, is enriched of fuel (section AB—isovolumic transformation);

the compression phase, in which the piston, moving from the bottom deadlock to the top deadlock, compresses the air/fuel mixture in the cylinder, the valves being closed (segment BC-transformation ideally adiabatic isentropic);

the expansion phase, which represents the useful work done by the engine, in which the expansion produced by the combustion of the air/fuel mixture, pushes the piston from top deadlock to bottom deadlock;

the combustion phase, in which shortly before the piston has reached the top deadlock the spark between the electrodes occurs by kindling the mixture that surrounds them, so the combustion propagates, with rapid increase of pressure, to the rest of the mixture (section C);

the expansion phase, in which the piston descends, allowing the expansion of the combustion gases (section DE-adiabatic transformation);

the exhaustion phase, in which before the piston has reached the bottom deadlock, the exhaust valve opens, allowing the gases that are still in the cylinder, at a pressure greater than the external resulting from the residual flame propagation, to discharge but still keeping the cylinder full of flue gas at a pressure near atmospheric pressure (section EF); and the expulsion phase, in which the piston, moving from the bottom deadlock to the top deadlock, pushes out, through the appropriate exhaust valve, the exhaust gas, only the gas filling the dead space remaining in the cylinder (section FA).

The power delivered by the engine may be increased in several known ways.

For example, the expansion of the cylinder capacity allows a power output increase, because more air is available in a larger combustion chamber as more fuel/air mixture can be burnt. This expansion can be achieved by increasing the number of cylinders or the volume of each individual cylinder. In general, this results in larger and heavy engines.

Another possibility to increase the power output of the engine is to increase its speed. This is possible by increasing the number of ignition strokes per unit of time. Due to the mechanical limits, however, this type of power increase is sparsely used. Furthermore, the increase of speed does grow exponentially friction and inertia, resulting in the decrease of the engine efficiency.

Another possibility is to supercharge the engine. As is known, in the mechanical motoring, different solutions are adopted for supercharging an engine, including the use of a turbocharger.

A turbocharger coupled to a vehicle engine consists of a turbine and a compressor connected by a common shaft supported on a bearing system. The turbocharger converts the energy lost by the exhaust gas into compressed air pushed into the engine and this allows the engine to produce more power and torque.

In engines without turbochargers, the engine operates as a naturally aspirated engine. In fact, the combustion air is drawn into the cylinder during the intake phase and is sucked from the external environment, which has a pressure equal to the environmental pressure. However, the combustion air is conditioned by the altitude as the oxygen decreases with increasing altitude. Conversely, in supercharged engines, the combustion air is compressed. Consequently, at fixed altitude, a greater amount of air and, therefore, oxygen can enter the combustion chamber. This involves the combustion of a greater quantity of combustion air, and the increase of the engine output power proportionally to the cylinder capacity.

Basically, we can distinguish the mechanically supercharged engines from turbocharged engines with exhaust gas at fixed or variable geometry.

In the first case, the combustion air is compressed by a compressor driven directly from the engine, by means of mechanical organs, such as belts, gear trains, etc. However, the growth of the output power is partially attenuated by the dispersion caused by the compressor operation. The power required for operating a mechanical compressor needs a part of the power delivered by the engine.

In the fixed geometry turbocharger the energy of the exhaust gas, which would normally be lost, is in part used to drive a turbine. In fact, there is a compressor mounted on the same axis of the turbine, that compresses the combustion air and then supplies it to the engine, without any mechanical connection to the engine, as already described. The body of the turbine comprises two components: the "blades wheel" of the turbine and the "enclosure/housing". The exhaust gas is guided into the turbine wheel from the housing and the energy present in the exhaust gas let the turbine rotate. Once the gas has passed through the blades of the turbine wheel, it comes out from the exhaust exit. The revolutions of the turbine wheel are determined by the speed of the engine, so if the engine is at a minimum mode the wheel rotates at a minimum speed. Due to the pressure on the accelerator, the wheel starts to spin faster due to the passage of a greater amount of air through the housing of the turbine.

Also the system of the compressor is constituted by a housing body and an impeller.

The impeller of the compressor, or "wheel" of the compressor, is connected to the turbine by a forged steel axis.

The combustion air is guided into the compressor wheel from the housing. Once compressed, the air leaves the body from the output of the compressor and flows into the engine cylinders. At its entry into the compressor, the air has a temperature equal to the atmospheric one but, due to a phenomenon of thermal transmission, it comes out at a temperature higher than 200° C. The temperature increase is determined by the contact of the combustion air with the body of the turbine, crossed by the exhaust gas at high temperature that drive the turbine, and, for the same volume, the temperature increase causes the decrease in the amount of oxygen present in the air, thus lowering the stoichiometric ratio. The temperature increase of the air can be counteracted by cooling the same, downstream of its exit from the compressor, by means of a heat exchanger called "intercooler".

A fixed geometry turbocharger comes into operation when the force provided by the exhaust gas is such as to let the turbine rotates, depending on the number of engine revolutions. Therefore, the fixed geometry turbochargers are good to use for the low, medium, or high engine revolutions.

A more effective but more complex method of turbocharging is the variable geometry method, which consists in the use of a turbine, which has the ability to capture, thanks to a system of movable blades, all the exhaust gas from a minimum condition of engine operating at low speed to a maximum condition of high speed.

However, the turbochargers currently used have various problems such as weight or size; require the installation of exhaust manifolds for each specific engine for connecting the same to the turbocharger; determine problems of negative environmental impact resulting from the failure emptying of the combustion chamber after a combustion cycle and the consequent accumulation of combustion residues in the subsequent cycles, caused by the need to restrict the cross section of the exhaust manifold in order to increase the speed for starting the turbine. Further, since the high temperature of the exhaust gas reaches 800/1000° C., it is required the use of blades of the turbine made with materials resistant to high temperatures, such as cast iron. However, this leads to an increase of weight of the turbocharger and makes necessary the use of lubricating oils, specific for turbo engines, resistant to high temperatures, which are pollutants. Moreover, relatively to the volumetric compressor a problem is constituted by the absorption of power of the engine caused by the need of the engine to drag all its the mechanical components.

A first solution to these problems has been described in the patent FR 2610672, which refers to a system interposed between the carburetor and the engine, consists of two turbines of different diameters connected on the same axis and rotating at the same speed and operating on an air-fuel mixture.

Although advantageous and able to supercharge an engine, the above described solution does not include a turbine-compressor system.

Although advantageous under many aspects, these solutions are not able to send the fluid to the impeller in a certain direction and cannot collect the fluid discharged from the first impeller conveying it in a suitable direction to the second impeller. Indeed, such a solution does include neither means which can send the fluid to the impeller in a given direction nor means collecting and guiding the fluid from the first to the second impeller, then most of the energy of the air is dispersed. Moreover, once crossed the first turbine at the ignition, the air goes partly through the second turbine and partly bumps on the turbine blades interfering in the rotation of the device, which can not exert work on the air. In addition, in the internal combustion engine, a pulsing pressure is determined during the alternating operation of the cylinders, at the time of the air intake in the intake high volume manifold. For these reasons and for the fact that the device described above is positioned very close to the valves, this device has not a good efficiency. Furthermore, a certain overpressure can be produced with such a device, due to the fact that the increase of air is dependent only on the ratio between the diameters of the two turbines. Furthermore, for the functionality, the positioning of the device between the carburetor and the engine, in an engine with carburetor, causes the following disadvantages: increased danger of backfiring, because the system is connected to the carburetor; and greater difficulty of the engine design, because the position of the system is closely linked to the position of the engine.

A second solution is presented in the patent DE 102010043800 published on Jun. 1, 2011, on behalf of Denso Corporation, which describes a turbocharger having a turbine driven by exhaust gases, disposed in the passage of the discharge opening, and a compressor disposed in the inlet passage. There is also a catalyst disposed in the passage of the discharge opening, on one side of the turbine, to clean it from the exhaust gases. This solution refers to a flue gas recirculation system which consists in putting into circulation a small percentage of the exhaust gases by passing them from the exhaust manifold to the intake manifold, in order to reduce part of the pollutants present in the exhaust gases. To obtain this flue gas recirculation, during the terminal phase of the discharge and the initial phase of the aspiration a special solenoid or hydraulic valve (EGR) is used, which is controlled by the engine control unit via a signal, allowing adjustment of the amount of exhaust gas by the collectors. The gases are recirculated into the intake manifolds and sucked into the engine. Together with the exhaust gases, the circuit also takes the gas coming from the carter and due to filtering through the piston rings and the engine evaporation oil.

Although advantageous under many aspects, this solution has several problems. Since it is a turbocharger driven by exhaust gases, its performance is compromised, not only for the variability of the characteristic ratio of the turbine operation, but also for the interference of the various discharges from different cylinders and also from the same cylinder, due to its inertia. Therefore, this method should be used such as the distributors of the turbine are reached separately by discharges of the various cylinders or such that the same sector of the distributor is reached only by the gas of cylinders whose exhaust phases do not overlap.

BRIEF SUMMARY

Purpose of the present invention is to provide a turbo-charging system of an engine, having characteristics such as to overcome the limitations which still affect the systems previously described with reference to the known technique.

According to the present invention a turbo-charging system of an engine is provided, as defined in claim 1.

BRIEF DESCRIPTION OF THE SEVERAL VIEWS OF THE DRAWINGS

For a better understanding of the present invention a preferred embodiment is now described, purely by way of non-limiting example, with reference to the accompanying drawings, in which:

FIGS. 3a-3b show schematic views respectively of a central body and of oil-lubricated bearings of the central body of the turbo-charging system, according to the invention;

FIGS. 4a-4b show schematic views respectively of a central body and a speed multiplier of the turbo-charging system, according to the invention;

DETAILED DESCRIPTION

Figure 1:
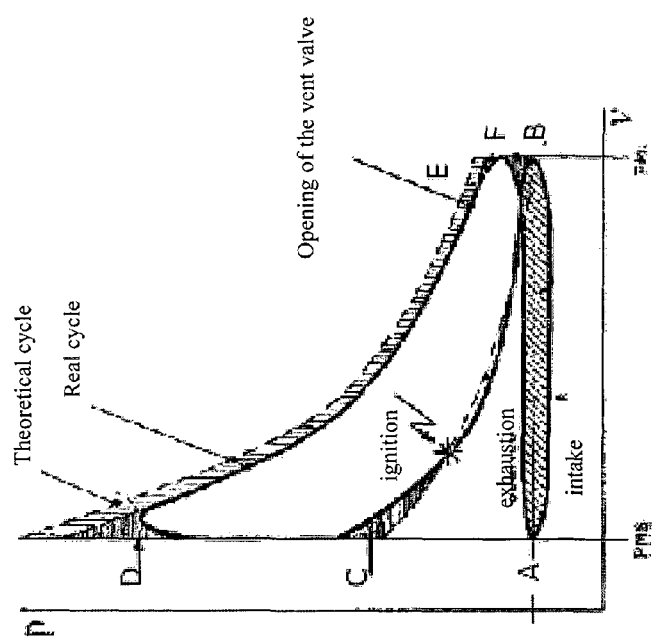
FIG. 1 shows the working cycle of the ideal carburetor four-stroke engine, according to the prior art.
Figure 2:
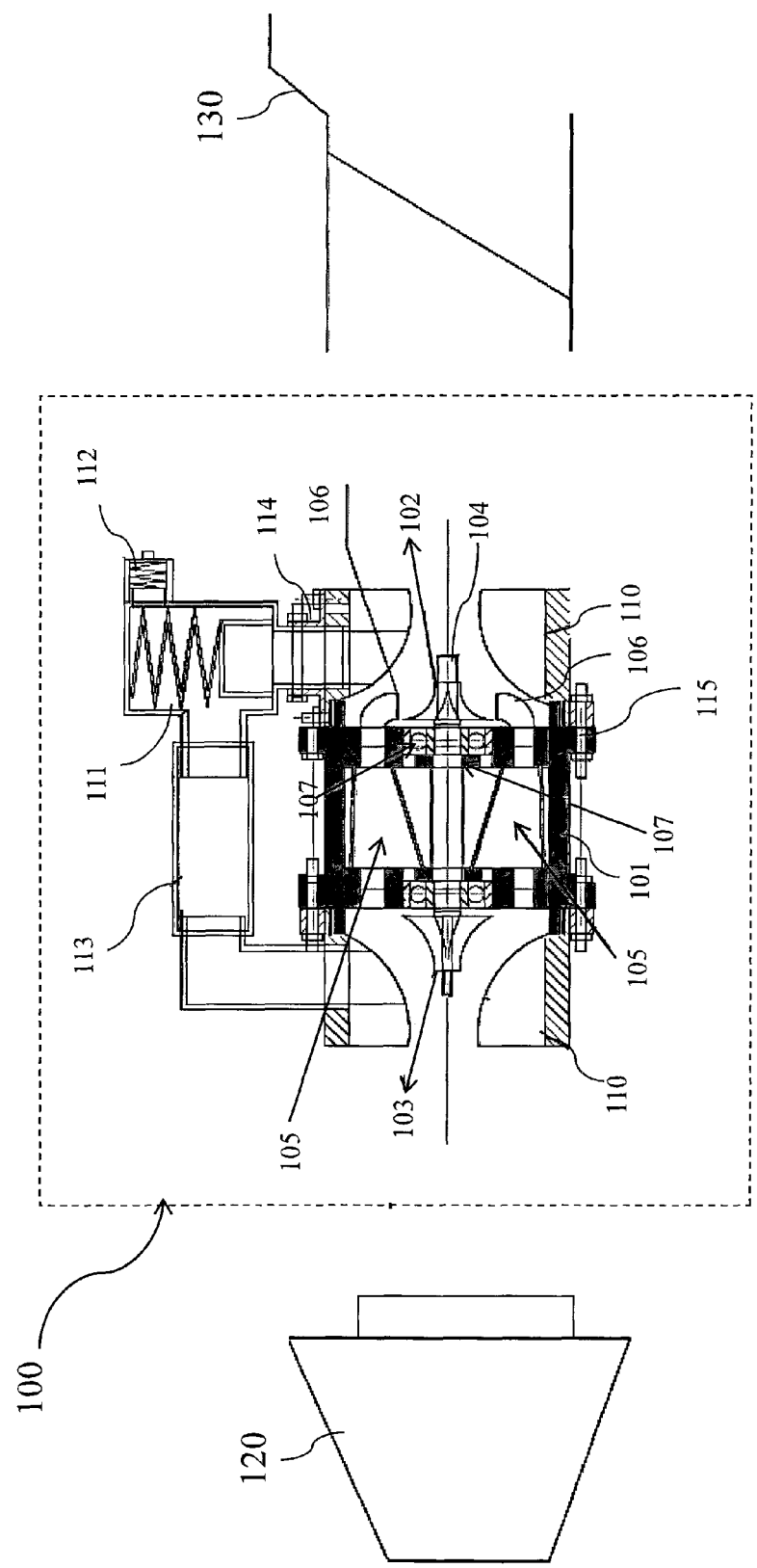
FIG. 2 shows a schematic view of a turbo-charging system placed between the air filter and the throttle unit of an engine, according to the invention.

With reference to these figures and, in particular, to the FIG. 2, a turbo-charging system 100 of an engine according to the invention is shown. In particular, the turbo-charging system 100 of an engine is interposed between the air filter 120 of the engine and the throttle unit 130 of the engine and comprises: a central body 101 on which a turbine 102 and a compressor 103 are mounted keyed on the same shaft 104; two Venturi tubes 105 comprised in the central body 101 and terminating with nozzles 106; rolling/sliding bearings 107 supporting the turbine 102; an oiler 108 and a speed multiplier 109 mounted on the central body 101, respectively shown in the FIGS. 3 and 4; two flange diffusers 110; an air-circulation valve 111; a valve 112 for discharging the air to the outside; an air recirculation pipe 113 connected to the air recirculation valve 111; a connection flange 114 for connecting to the recirculation valve 111, for one of the two flange diffusers 110; connecting means 115 for mounting the turbocharger 103.

FIG. 3a shows in more details the central body 101, highlighting the oil-lubricated bearings 107, and FIG. 3b shows a magnified image of the bearings 107 with the oiler 108.

FIG. 4a shows in more details the central body 101, highlighting the speed multiplier 109, and FIG. 4b shows a magnified image of the speed multiplier 109.

According to an aspect of the invention, the system 100 operates on a single air flow.

Figure 5:
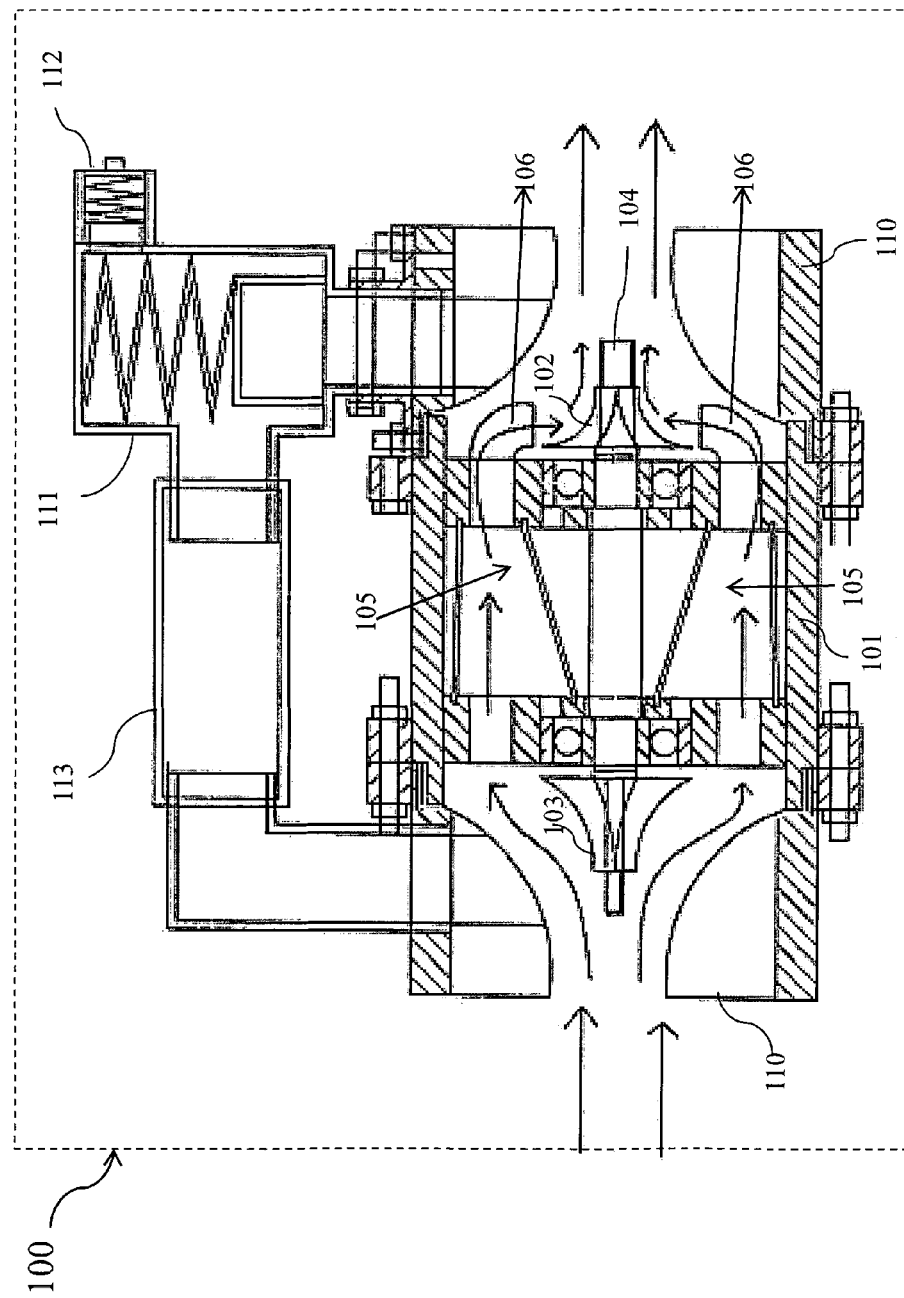
FIG. 5 shows a schematic view of the path taken from the air, leaving the air filter, within the turbo-charging system, according to the invention.

Instead, FIG. 5 shows the system 100 of FIG. 2 highlighting the path followed by the air flow coming from the air filter 120, entering in the system 100 and exiting toward the throttle unit 130. More specifically, when the engine is started, the air coming from the intake phase of the engine, through the filter 120, is conveyed, via the first diffuser 110, in correspondence of the compressor 103 into the Venturi pipes 105. Thereafter, the air, coming out from the nozzles 106, is fed into the turbine 102 keyed on the same shaft 104 of the compressor 103. So, the turbine 102 is activated and consequently determines movement of the compressor 103, which starts to supercharge the engine. During the acceleration phase, in which the throttle unit 130 is opened, the air flow increases therefore increasing the supercharging of the engine.

Advantageously according to the invention, the air recirculation valve 111 has the function of decreasing the air pressure between the turbine 102 and the throttle unit 130, safeguarding the integrity of the throttle valve when it is closed, out of phase acceleration, putting back the air into circulation in the air recirculation pipes 113, or alternatively, expelling the air to the outside through the air vent valve 112.

Advantageously according to the invention, the turbocharger can be made with light metals.

Figure 6:
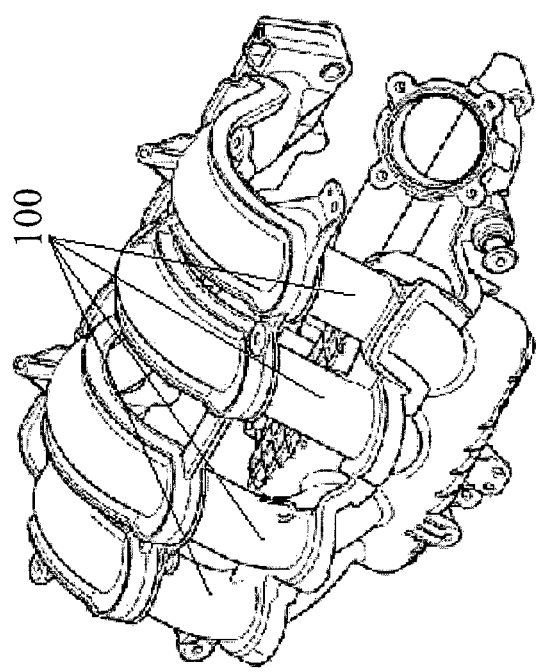
FIG. 6 shows a three-dimensional schematic view of an intake manifold of an internal combustion engine comprising the turbo-charging system, according to the invention.

Advantageously according to the invention, as shown in FIG. 6, the turbocharging system 100 is comprised within each intake air-box of the intake manifold of an internal combustion engine 150, for example an injection engine. Such application embodiment is particularly advantageous since the injection engine favors the increase of the volumetric efficiency, for the possible greater size of the supply conduits, the elimination of the danger of backfiring, because the conduits are devoid of fuel and the greater ease of design of the engine, since the position of the injection system (pump, any distributor, regulator, injectors) is not strictly bound to the position of the engine. Therefore, by suitably dimensioning the turbocharging system 100, a number of such systems 100 may be positioned within the intake air-boxes of the intake manifold after the throttle valve, near the intake valves, one for each engine cylinder. In this way, advantageously according to the invention, the pressure waves in the intake conduit are used to increase the filling of each cylinder at low and medium/low rotation speed of the engine. In use, when the turbocharging system 100 doesn't receive the intake air it continues to rotate by inertia and the excess air is discharged to the outside through the exhaust valve 112 or fed back into the circuit from the valve 111, shown in FIGS. 2 and 5. The use of the fittings 113 of the turbocharging system 100 or the installation of tanks of appropriate size can be used as accumulators of compressed air and the valves 111, by means of electronic control, can download the most appropriate moment a greater volume of air in the cylinder.

More in details, when the engine is turned on, the external input air originated from the suction phase of the engine trough the filter 120, is conveyed, by means of the first diffuser 110, in correspondence of the first compressor 103 and then to the Venturi tubes 105. After, the air, going out from the nozzles 106, is conveyed in the turbine 102 mounted on the same shaft 104 of the compressor 103. The turbine 102, which works due to the effect of the air flow generated by the descent of the pistons in the suction phase, activates the compressor 103, which starts to supercharge the engine. During the acceleration phase, during which the throttle unit 130 is opened, the air flow arriving at the filter 120 increases and allows to increase the rotation of the turbine 102 and of the compressor 103. The compressor 103 reaches the optimal condition and provides the Venturi tubes 105 with an higher air flow which will be addressed by means of the nozzles 106 to the turbine 102. Due to the effect of the diffuser 110 at the output of the turbine 102, the pressure will be increased and consequently, advantageously according to the invention, an air flow having pressure higher than the pressure of the air flow at the input of the filter 120, thus obtaining the supercharging of the engine.

Regarding the operation of the turbocharging system of an engine, according to the invention, the Applicant has performed a theoretical study of the thermodynamic efficiency of the turbine, of the transmission between the turbine and the compressor, and of the thermodynamic efficiency of the compressor. The study is based on the consideration that the thermal engine transforms the highest part of the heat obtained from the burned combustible substances into mechanical work of the combustion products, thanks to the pressure exercised by the latter against the movable wall of a volumetric machine. The Applicant considered that, for the thermodynamic analysis of the turbocharger driven by exhaust gases, it is generally assumed that the transformations that affect the air and flue gas, respectively in the compressor and in the turbine, take place without exchanging heat with the machines. In the reality, a certain amount of heat is exchanged and, because of the turbocharger is not an ideal machine, the transformations that occur inside it are produced inefficiently. The efficiency of the turbocharger increases with the increasing of the overall efficiency of the turbocharger itself, with the ratio between the temperature of the flue gas at the turbine inlet and the temperature of the air intake of the compressor, with the expansion ratio in the turbine. Instead, the yield loss results from loss of discharge kinetic energy, due to non-use of part of the kinetic energy of the fluid discharged from the machine, by the friction in the fixed and mobile ducts, the passage from one blade to another blade having different speed, from the marginal leakage of the fluid from the joints. Furthermore, if the temperature of the flue gas at the turbine inlet is lower than a certain value, the turbocharger will not work in optimal conditions, because the mechanical power recovered by the turbine will not be sufficient to move the compressor. In the opposite case, however, the excess of mechanical power to the compressor shaft will tend to move the operating point of the turbocharger to higher compression ratios. Because the second law of thermodynamics states that it is impossible to achieve a transformation whose only result is to convert the heat taken from a source in work, the thermodynamic efficiency of the turbine is lower than 1, the mechanical efficiency of the transmission between the turbine and the compressor is lower than 1, and the thermodynamic efficiency of the compressor is lower than 1. The overall performance of the turbochargers currently available on the market, which is variable with the operating conditions, may be tentatively assumed between 0.5/0.65. In addition, the first law of thermodynamics states that any system of particles can interact with the external environment in four different ways by absorbing heat from the environment, releasing heat, doing work on the environment, sustaining a work. Each of these interactions is equivalent to an exchange of energy between the system and the external environment and produces a change in the internal energy of the system. If the system loses heat, or does work, its internal energy decreases; if it receives heat or sustains a work from the outside, its internal energy increases. Therefore, any phenomenon takes place due to changes in potential and kinetic energy. The operation of all turbochargers currently used by the automotive industry is based on the thermodynamic principles mentioned above, on the foregoing and on equal volumes emitted in the exhaust phase and sucked into the suction phase is based, as well as for the present invention. However, it should be considered that the present invention uses pre-combustion air, connected to the intake system of the engine, which does release deposits neither on ducts nor on the turbine blades, resulting in advantages in terms of performance, thanks to the fact that the cylinders are filled with fresh air as much as possible. Furthermore, the filling of the cylinder is influenced by the geometrical characteristics of the intake conduits and by the geometry of the discharge. Therefore, the use of the present invention increases the overall efficiency of the engine since it guarantees a supercharger and an optimum filling of the cylinder, not obstructing the outside exit of the exhaust gases. Moreover, the intake air has a lower temperature than those of the exhaust gases, for which, using the present invention, it is not necessary to install cooling systems, nor requires the use of heavy materials.

Therefore, the turbocharging system of an engine according to the invention, being positioned between the air filter and the throttle unit of the engine, does not undergo overheating to which known turbocharging systems are subjected.

Another advantage of the turbocharging system of an engine according to the invention consists in the possibility of mounting on engines of the same category of cylinder capacity, directly on the intake pipe, eliminating the need for specific connections and resulting in reduced production costs.

Additionally, the turbocharging system of an engine according to the invention allows small volumes occupation and fast and quick installation.

Furthermore, the turbocharging system of an engine according to the invention has a total weight reduced as the turbocharger can be made with light metals.

Moreover, the turbocharging system of an engine according to the invention allows to increase the efficiency of the engine, as it allows to totally empty the combustion chamber after a combustion cycle, eliminating the problem of the accumulation of combustion residues in the subsequent cycles affecting the known systems.

And yet, the turbocharging system of an engine according to the invention allows to replace fixed geometry turbine with a variable geometry turbine to increase the efficiency of the turbo compression system.

Finally, with the turbocharging system of an engine according to the invention it is possible to keep clean the turbine, saving the cost of maintenance.

Finally it is clear that the turbocharging system of an engine described and illustrated here can be modified and varied without departing from the protective scope of the present invention, as defined in the appended claims.

The invention claimed is:

1. A turbo-charging system of an engine the turbo-charging comprising:
   a shaft;
   a central body;
   a turbine and a compressor both keyed on the shaft and mounted on the central body;
   two Venturi tubes comprised in the central body and ending with nozzles; and
   at least two flange diffusers connected to the two Venturi tubes;

wherein the turbo-charging system is configured to be interposed between an air filter throttle unit of the engine, the turbine being configured to receive at the nozzles engine intake air from an output of the air filter whose flow determines movement of the turbine and, through the shaft, of the compressor.

2. The turbo-charging system according to claim 1, comprising an air recirculation valve and an air recirculation pipe connected to the valve, both configured to decrease air pressure between the turbine and the throttle unit in a configuration in which the throttle unit is closed.

3. The turbo-charging system according to claim 1, comprising a connecting flange connecting the recirculation valve to the central body.

4. The turbo-charging system according to claim 1, comprising a valve configured to discharge air outside and decrease air pressure between the turbine and the throttle unit in a configuration in which the throttle unit is closed.

5. The turbo-charging system according to claim 1, comprising rolling/sliding bearings to support the turbine.

6. The turbo-charging system according to claim 5, comprising an oiler configured to oil the bearings, which are mounted on the central body.

7. The turbo-charging system according to claim 1, comprising a speed multiplier mounted on the central body.

8. An intake manifold of an internal combustion engine comprising the turbo-charging system according to claim 1.

* * * * *